US012642302B2

(12) United States Patent
Batista et al.

(10) Patent No.: US 12,642,302 B2
(45) Date of Patent: Jun. 2, 2026

(54) AEROSOL-GENERATING DEVICE COMPRISING AIR INLETS FOR CENTRAL AND PERIPHERAL AIRFLOW

(71) Applicant: Philip Morris Products S.A., Neuchatel (CH)

(72) Inventors: Rui Nuno Batista, Morges (CH); Ricardo Cali, Mannheim (DE)

(73) Assignee: Philip Morris Products S.A., Neuchatel (CH)

(*) Notice: Subject to any disclaimer, the term of this patent is extended or adjusted under 35 U.S.C. 154(b) by 740 days.

(21) Appl. No.: 17/761,435

(22) PCT Filed: Sep. 16, 2020

(86) PCT No.: PCT/EP2020/075881
§ 371 (c)(1),
(2) Date: Mar. 17, 2022

(87) PCT Pub. No.: WO2021/053023
PCT Pub. Date: Mar. 25, 2021

(65) Prior Publication Data

US 2022/0338550 A1 Oct. 27, 2022

(30) Foreign Application Priority Data

Sep. 19, 2019 (EP) .................................... 19198282

(51) Int. Cl.
*A24F 40/485* (2020.01)
*A24F 40/20* (2020.01)
(Continued)

(52) U.S. Cl.
CPC ............ *A24F 40/485* (2020.01); *A24F 40/20* (2020.01); *A24F 40/465* (2020.01); *H05B 6/105* (2013.01)

(58) Field of Classification Search
None
See application file for complete search history.

(56) References Cited

U.S. PATENT DOCUMENTS

| | | | | |
|---|---|---|---|---|
| 2017/0105452 | A1* | 4/2017 | Mironov | A24F 40/42 |
| 2018/0332894 | A1 | 11/2018 | Gill et al. | |
| 2020/0060348 | A1 | 2/2020 | Mironov et al. | |

FOREIGN PATENT DOCUMENTS

| | | | |
|---|---|---|---|
| CN | 108289515 | A | 7/2018 |
| JP | 2017-515486 | A | 6/2017 |

(Continued)

OTHER PUBLICATIONS

International Preliminary Report on Patentability and Written Opinion issued Mar. 31, 2022 in PCT/EP2020/075881, 7 pages.

(Continued)

*Primary Examiner* — Katherine A Will
(74) *Attorney, Agent, or Firm* — Oblon, McClelland, Maier & Neustadt, L.L.P.

(57) ABSTRACT

An aerosol-generating device is provided, including: a cavity configured to receive an aerosol-generating article including an aerosol-forming substrate; a first air inlet fluidly connected with the cavity and configured to enable ambient air to be drawn into the cavity; and a second air inlet fluidly connected with the cavity and configured to enable ambient air to be drawn into the cavity, the first air inlet being further configured to be fluidly connected with a central portion of the cavity, and the second air inlet being further configured to be fluidly connected with a peripheral portion of the cavity.

15 Claims, 5 Drawing Sheets

(51) Int. Cl.

| | |
|---|---|
| ***A24F 40/465*** | (2020.01) |
| ***H05B 6/10*** | (2006.01) |

(56) References Cited

FOREIGN PATENT DOCUMENTS

| | | | | | |
|---|---|---|---|---|---|
| JP | 2018-534926 | A | | 11/2018 | |
| RU | 2 297 781 | C2 | | 4/2007 | |
| RU | 2 602 053 | C2 | | 11/2016 | |
| RU | 2 666 487 | C1 | | 9/2018 | |
| WO | WO-2013083635 | A1 | * | 6/2013 | ........... A24F 47/008 |
| WO | WO 2017/064487 | A1 | | 4/2017 | |
| WO | WO-2017115182 | A1 | * | 7/2017 | ............... A24D 1/22 |
| WO | WO-2018206616 | A1 | * | 11/2018 | ........... A24B 15/167 |
| WO | WO-2019030353 | A1 | * | 2/2019 | ........... A24F 40/465 |
| WO | WO 2019/096983 | A1 | | 5/2019 | |
| WO | WO-2019224068 | A1 | * | 11/2019 | ............. A24B 15/14 |
| WO | WO-2020064684 | A1 | * | 4/2020 | ............... A24D 1/20 |
| WO | WO-2021053030 | A1 | * | 3/2021 | ........... A24F 40/465 |

OTHER PUBLICATIONS

Chinese Office Action with attached search report issued Jan. 2, 2024 in Chinese Application No. 202080065659.9 (with English translation), 9 pages.

Korean Office Action issued Mar. 4, 2024 in Korean Application 10-2022-7008750, (with English translation), 11 pages.

Japanese Decision to Grant issued Jul. 4, 2024 in Japanese Patent Application No. 2022-514208, 2 pages.

International Search Report issued Nov. 12, 2020 in PCT/EP2020/075881 filed Sep. 16, 2020, 11 pages.

Russian Search Report issued Sep. 5, 2022 in Russian Patent Application No. 2022107075 (with English translation), 4 pages.

* cited by examiner

AEROSOL-GENERATING DEVICE COMPRISING AIR INLETS FOR CENTRAL AND PERIPHERAL AIRFLOW

The present invention relates to an aerosol-generating device.

It is known to provide an aerosol-generating device for generating an inhalable vapor. Such devices may heat aerosol-forming substrate to a temperature at which one or more components of the aerosol-forming substrate are volatilised without burning the aerosol-forming substrate. Aerosol-forming substrate may be provided as part of an aerosol-generating article. The aerosol-generating article may have a rod shape for insertion of the aerosol-generating article into a cavity, such as a heating chamber, of the aerosol-generating device. A heating element may be arranged in or around the heating chamber for heating the aerosol-forming substrate once the aerosol-generating article is inserted into the heating chamber of the aerosol-generating device. The heating element may be a resistive heating element. Recently, it has been proposed to use induction heating for heating the aerosol-forming substrate. Airflow through the aerosol-forming substrate may be inhomogeneous. This may be undesired. Airflow into the cavity may be inhomogeneous.

It would be desirable to have an aerosol-generating device with improved aerosol generation. It would be desirable to have an aerosol-generating device with improved airflow. It would be desirable to have an aerosol-generating device with more homogeneous airflow.

According to an embodiment of the invention there is provided an aerosol-generating device comprising a cavity for receiving an aerosol-generating article comprising aerosol-forming substrate. The device further comprises a first air inlet fluidly connected with the cavity and enabling ambient air to be drawn into the cavity. The device further comprises a second air inlet fluidly connected with the cavity and enabling ambient air to be drawn into the cavity. The first air inlet is configured fluidly connected with a central portion of the cavity. The second air inlet is configured fluidly connected with a peripheral portion of the cavity.

Providing two air inlets improves aerosol generation, since the air from the two air inlets can be directed to different parts of the aerosol-forming substrate of the aerosol-generating article.

The aerosol-generating device may further comprise an induction heating arrangement. The induction heating arrangement may comprise an induction coil and a susceptor assembly. The susceptor assembly may comprise a central susceptor arrangement arranged centrally within the cavity and a peripheral susceptor arrangement arranged distanced from and around the central susceptor arrangement.

The aerosol-generating article is preferably configured as a hollow aerosol-generating article so that the aerosol-generating article can be sandwiched between the central susceptor arrangement and the peripheral susceptor arrangement. The aerosol-generating article may comprise a substrate portion comprising a first tubular aerosol-forming substrate layer constituting an inner layer and a second tubular aerosol-forming substrate layer arranged surrounding the first tubular aerosol-forming substrate layer and constituting an outer layer. The central susceptor arrangement may be configured to heat the first tubular aerosol-forming substrate layer. The peripheral susceptor arrangement may be configured to heat the second tubular aerosol-forming substrate layer. The aerosol-generating article will be described in more detail below.

The central portion of the cavity may be arranged within the central susceptor arrangement. The central susceptor arrangement may be hollow. The central susceptor arrangement may comprise at least two central susceptors defining a hollow cavity between the central susceptors. The hollow configuration of the central susceptor arrangement may enable airflow into the hollow central susceptor arrangement. Gaps may be provided between the at least two central susceptors. As a consequence, airflow may be enabled through the central susceptor arrangement. The airflow may be enabled in a direction parallel or along the longitudinal central axis of the cavity. Preferably, by means of the gap, airflow may be enabled in a lateral direction. Lateral airflow may enable aerosol generation due to contact between the incoming air and the aerosol-generating substrate of the aerosol-generating article through the gaps between the central susceptors. Heating of the central susceptor arrangement, when the aerosol-generating article is inserted into the cavity, may lead to aerosol generation within the hollow central susceptor arrangement. The central susceptor arrangement may be configured to heat the first tubular aerosol-forming substrate layer of the aerosol-generating article. The central susceptor arrangement may be configured to heat the inside of the aerosol-generating article. The aerosol may be drawn in a downstream direction through the hollow central susceptor arrangement.

The central portion of the cavity may be the inner volume of the central susceptor arrangement. The central portion of the cavity may correspond to the volume of the central susceptor arrangement. The central portion of the cavity may have a cylindrical shape. The central portion of the cavity may be elongate. The central portion of the cavity may extend along the longitudinal central axis of the cavity. The outer diameter of the central portion of the cavity may correspond to the inner diameter of the substrate portion of the aerosol-generating article.

The central portion may have a base. The base may be arranged at the upstream or distal end of the central portion. The first air inlet may be fluidly connected with the base of the central portion. The central portion may comprise one or more air apertures for allowing air to flow into the central portion.

The peripheral portion of the cavity may be arranged around the central susceptor assembly and within the peripheral susceptor assembly. When the aerosol-generating article is inserted into the cavity, the substrate portion of the aerosol-generating article may be arranged in the peripheral portion of the cavity. The peripheral portion of the cavity may be tubular. The inner diameter of the peripheral portion may correspond to the inner diameter of the substrate portion of the aerosol-generating article. The outer diameter of the peripheral portion may correspond to the outer diameter of the substrate portion of the aerosol-generating article. The peripheral susceptor arrangement may be arranged surrounding the peripheral portion of the cavity. The peripheral susceptor arrangement may be arranged in the peripheral portion of the cavity.

The aerosol-generating device may comprise a first airflow channel fluidly connecting the first air inlet with the central portion of the cavity. Between the first air inlet and the base of the central portion of the cavity, the first airflow channel may be arranged. The first airflow channel may fluidly connect the first air inlet with the base. The first air inlet may be provided in the housing of the aerosol-generating device. The first air inlet may comprise multiple individual air inlets. The individual air inlets may be arranged on opposite sides of the housing of the aerosol-generating device. The first air inlet may have a circular cross-section. The first air inlet may have a rectangular cross-section. The first air inlet may have an oval or elliptical cross-section. The first air inlet may have an extension direction perpendicular to the longitudinal axis of the aerosol-generating device.

The aerosol-generating device may comprise a second airflow channel fluidly connecting the second air inlet with the peripheral portion of the cavity. The second air inlet may be provided in the housing of the aerosol-generating device. The second air inlet may comprise multiple individual air inlets. The individual air inlets may be arranged on opposite sides of the housing of the aerosol-generating device. The second air inlet may have a circular cross-section. The second air inlet may have a rectangular cross-section. The second air inlet may have an oval or elliptical cross-section. The second air inlet may have an extension direction perpendicular to the longitudinal axis of the aerosol-generating device.

The first air inlet may be arranged distanced from the second air inlet. The first air inlet may be configured fluidly separated from the second air inlet. The first airflow channel may be arranged distanced from the second airflow channel. The first airflow channel may be configured fluidly separated from the second airflow channel.

The first airflow channel may be arranged upstream of the cavity. The first airflow channel may be arranged distal of the cavity. The first airflow channel may be arranged upstream of the second airflow channel. The first airflow channel may be arranged distal of the second airflow channel. The first airflow channel may extend essentially perpendicular to the longitudinal central axis of the cavity downstream of the first air inlet. Downstream of the perpendicular portion, the direction of the first air inlet may change to be along the longitudinal central axis, preferably directly on the longitudinal central axis, of the cavity. The base arranged upstream of the central portion of the cavity may be arranged on the longitudinal central axis of the cavity. Ambient air may be drawn through the first air inlet and the first airflow channel centrally through the central portion of the cavity.

The second airflow channel may be arranged adjacent an upstream portion of the cavity. The second airflow channel may be arranged adjacent an upstream end of the cavity. The second airflow channel may be substantially perpendicular to the longitudinal central axis of the cavity downstream of the second air inlet. Instead of the first airflow channel, the second airflow channel may be arranged to direct the air towards the periphery around the longitudinal central axis of the cavity, more particularly the peripheral portion of the cavity. The second airflow channel may be configured to prevent air from being drawn to the center of the cavity or along the longitudinal central axis of the cavity.

One or both of the central susceptor assembly and the peripheral susceptor assembly may comprise susceptors that are elongate.

The central susceptor arrangement may comprise a central susceptor. The central susceptor arrangement may comprise at least two central susceptors. The central susceptor arrangement may comprise more than two central susceptors. The central susceptor arrangement may comprise four central susceptors. The central susceptor arrangement may consist of four central susceptors. At least one of, preferably all, of the central susceptor(s) may be elongate.

The central susceptor may be arranged parallel to the longitudinal central axis of the cavity. If multiple central susceptors are provided, each central susceptor may be arranged equidistant parallel to the longitudinal central axis of the cavity.

The peripheral susceptor arrangement may comprise an elongate, preferably blade-shaped susceptor, or a cylinder-shaped susceptor. The peripheral susceptor arrangement may comprise at least two blade-shaped susceptors. The blade-shaped susceptors may be arranged surrounding the cavity. The blade-shaped susceptors may be arranged parallel to the longitudinal central axis of the cavity. The blade-shaped susceptors may be arranged inside of the cavity. The blade-shaped susceptors may be arranged for holding the aerosol-generating article, when the aerosol-generating article is inserted into the cavity. The blade-shaped susceptors may have flared downstream ends to facilitate insertion of the aerosol-generating article into the blade shaped susceptors. Air may flow into the cavity between the blade-shaped susceptors. Gaps may be provided between individual blade-shaped susceptors. The air may subsequently contact or enter into the aerosol-generating article. A uniform penetration of the aerosol-generating article with air may be achieved in this way, thereby optimizing aerosol generation. The peripheral susceptor arrangement may be configured to heat the second tubular aerosol-forming substance layer of the aerosol-generating article. The peripheral susceptor arrangement may be configured to heat the outside of the aerosol-generating article.

One or both of the central susceptor assembly and the peripheral susceptor assembly may be arranged around the central longitudinal axis of the cavity. If multiple central susceptors are provided, the central susceptors may be arranged in a ring-shaped orientation around the central longitudinal axis of the cavity. When the aerosol-generating article is inserted into the cavity, the aerosol-generating article may be centred in the cavity by means of the arrangement of the central susceptor arrangement. The peripheral susceptor arrangement may be arranged around the central susceptor arrangement. If the peripheral susceptor arrangement comprises multiple peripheral susceptors, each peripheral susceptor may be arranged equidistant parallel to the central longitudinal axis of the cavity.

The central susceptor arrangement may have a ring-shaped cross-section. The central susceptor arrangement may comprise at least two central susceptors defining a hollow cavity with a ring-shaped cross section. The central susceptor arrangement may be tubular. If the central susceptor arrangement comprises at least two central susceptors, the central susceptors may be arranged to form the tubular central susceptor arrangement. Preferably, airflow is enabled through the central susceptor arrangement through gaps between the central susceptors.

The peripheral susceptor may have a ring-shaped cross-section. The peripheral susceptor arrangement may comprise at least two peripheral susceptors defining a hollow cavity with a ring-shaped cross section. The peripheral susceptor arrangement may be tubular.

The peripheral susceptor arrangement may have an inner diameter larger than an outer diameter of the central susceptor arrangement. Between the peripheral susceptor arrangement and the central susceptor arrangement, the cavity may be arranged. The cavity may be configured as an annular hollow cylinder-shaped cavity.

One or both of the central susceptor assembly and the peripheral susceptor assembly may define a part of the cavity. The cavity may comprise one or both of the central susceptor assembly and the peripheral susceptor assembly. The central susceptor assembly may be arranged in the central portion of the cavity. The peripheral susceptor assembly may be arranged in the peripheral portion of the cavity. The peripheral susceptor assembly may define the outer circumference of the cavity.

The central susceptor assembly and the peripheral susceptor assembly may be coaxially arranged.

The aerosol-generating device may comprise a power supply. The power supply may be a direct current (DC) power supply. The power supply may be electrically connected to the induction coil. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts). The aerosol-generating device may advantageously comprise a direct current to alternating current (DC/AC) inverter for converting a DC current supplied by the DC power supply to an alternating current. The DC/AC converter may comprise a Class-D, Class-C or Class-E power amplifier. The power supply may be configured to provide the alternating current.

The power supply may be a battery, such as a rechargeable lithium ion battery. Alternatively, the power supply may be another form of charge storage device such as a capacitor. The power supply may require recharging. The power supply may have a capacity that allows for the storage of enough energy for one or more uses of the aerosol-generating device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations.

The power supply to the induction coil may be configured to operate at high frequency. A Class-E power amplifier is preferable for operating at high frequency. As used herein, the term 'high frequency oscillating current' means an oscillating current having a frequency of between 500 kilohertz and 30 megahertz. The high frequency oscillating current may have a frequency of from about 1 megahertz to about 30 megahertz, preferably from about 1 megahertz to about 10 megahertz and more preferably from about 5 megahertz to about 8 megahertz.

In another embodiment the switching frequency of the power amplifier may be in the lower kHz range, e.g. between 100 kHz and 400 KHz. In the embodiments, where a Class-D or Class-C power amplifier is used, switching frequencies in this kHz range are particularly advantageous. A switching transistor will have a ramp-up and ramp-down time, a down time and an on time. Hence, if in a Class-D power amplifier a set of two or four (operating in pairs) switching transistors are used, a switching frequency in the lower kHz range will take into account a necessary down time of one transistor before the second one is ramped-up, in order to avoid a destruction of the power amplifier.

The induction heating arrangement may be configured to generate heat by means of induction. The induction heating arrangement comprises the induction coil and the susceptor assembly. A single induction coil may be provided. A single susceptor assembly may be provided. Preferably, more than a single induction coil is provided. A first induction coil and a second induction coil may be provided. Preferably, more than a single susceptor assembly is provided. As described herein, the susceptor assembly comprises a central susceptor arrangement and a peripheral susceptor arrangement. The induction coil may surround the susceptor assembly. The first induction coil may surround a first region of the susceptor assembly. The second induction coil may surround a second region of the susceptor assembly. A region surrounded by an induction coil may be configured as a heating zone as described in more detail below.

The aerosol-generating device may comprise a flux concentrator. The flux concentrator may be made from a material having a high magnetic permeability. The flux concentrator may be arranged surrounding the induction heating arrangement. The flux concentrator may concentrate the magnetic field lines to the interior of the flux concentrator thereby increasing the heating effect of the susceptor assembly by means of the induction coil.

The aerosol-generating device may comprise a controller. The controller may be electrically connected to the induction coil. The controller may be electrically connected to the first induction coil and to the second induction coil. The controller may be configured to control the electrical current supplied to the induction coil(s), and thus the magnetic field strength generated by the induction coil(s).

The power supply and the controller may be connected to the induction coil, preferably the first and second induction coils and configured to provide the alternating electric current to each of the induction coils independently of each other such that, in use, the induction coils each generate the alternating magnetic field. This means that the power supply and the controller may be able to provide the alternating electric current to the first induction coil on its own, to the second induction coil on its own, or to both induction coils simultaneously. Different heating profiles may be achieved in that way. The heating profile may refer to the temperature of the respective induction coil. To heat to a high temperature, alternating electric current may be supplied to both induction coils at the same time. To heat to a lower temperature or to heat only a portion of the aerosol-forming substrate of the aerosol-generating article, alternating electric current may be supplied to the first induction coil only. Subsequently, alternating electric current may be supplied to the second induction coil only.

The controller may be connected to the induction coils and the power supply. The controller may be configured to control the supply of power to the induction coils from the power supply. The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to the induction coil(s). Current may be supplied to the induction coil(s) continuously following activation of the aerosol-generating device or may be supplied intermittently, such as on a puff by puff basis.

The power supply and the controller may be configured to vary independently the amplitude of the alternating electric current supplied to each of the first induction coil and the second induction coil. With this arrangement, the strength of the magnetic fields generated by the first and second induction coils may be varied independently by varying the amplitude of the current supplied to each coil. This may facilitate a conveniently variable heating effect. For example, the amplitude of the current provided to one or both of the coils may be increased during start-up to reduce the initiation time of the aerosol-generating device.

The controller may be configured to be able to chop the current supply on the input side of the DC/AC converter. This way the power supplied to the induction coil(s) may be controlled by conventional methods of duty-cycle management.

The first induction coil of the aerosol-generating device may form part of a first circuit. The first circuit may be a resonant circuit. The first circuit may have a first resonant frequency. The first circuit may comprise a first capacitor. The second induction coil may form part of a second circuit. The second circuit may be a resonant circuit. The second circuit may have a second resonant frequency. The first resonance frequency may be different from the second resonance frequency. The first resonance frequency may be identical to the second resonance frequency. The second circuit may comprise a second capacitor. The resonant frequency of the resonant circuit depends on the inductance of the respective induction coil and the capacitance of the respective capacitor.

The cavity of the aerosol-generating device may have an open end into which the aerosol-generating article is inserted. The open end may be a proximal end. The cavity may have a closed end opposite the open end. The closed end may be the base of the cavity. The closed end may be closed except for the provision of the air apertures arranged in the base. The base of the cavity may be flat. The base of the cavity may be circular. The base of the cavity may be arranged upstream of the cavity. The open end may be arranged downstream of the cavity. The cavity may have an elongate extension. The cavity may have a longitudinal central axis. A longitudinal direction may be the direction extending between the open and closed ends along the longitudinal central axis. The longitudinal central axis of the cavity may be parallel to the longitudinal axis of the aerosol-generating device.

The cavity may be configured as a heating chamber. The cavity may have a cylindrical shape. The cavity may have a hollow cylindrical shape. The cavity may have a circular cross-section. The cavity may have an elliptical or rectangular cross-section. The cavity may have an inner diameter corresponding to the outer diameter of the aerosol-generating article.

As used herein, the term 'length' refers to the major dimension in a longitudinal direction of the aerosol-generating device, of an aerosol-generating article, or of a component of the aerosol-generating device or an aerosol-generating article.

As used herein, the term 'width' refers to the major dimension in a transverse direction of the aerosol-generating device, of an aerosol-generating article, or of a component of the aerosol-generating device or an aerosol-generating article, at a particular location along its length. The term 'thickness' refers to the dimension in a transverse direction perpendicular to the width.

As used herein, the term 'aerosol-forming substrate' relates to a substrate capable of releasing volatile compounds that can form an aerosol. Such volatile compounds may be released by heating the aerosol-forming substrate. An aerosol-forming substrate is part of an aerosol-generating article.

As used herein, the term 'aerosol-generating article' refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco is referred to as a tobacco stick. The aerosol-generating article may be insertable into the cavity of the aerosol-generating device.

As used herein, the term 'aerosol-generating device' refers to a device that interacts with an aerosol-generating article to generate an aerosol.

As used herein, the term 'aerosol-generating system' refers to the combination of an aerosol-generating article, as further described and illustrated herein, with an aerosol-generating device, as further described and illustrated herein. In the system, the aerosol-generating article and the aerosol-generating device cooperate to generate a respirable aerosol.

As used herein, the term 'proximal' refers to a user end, or mouth end of the aerosol-generating device, and the term 'distal' refers to the end opposite to the proximal end. When referring to the cavity, the term 'proximal' refers to the region closest to the open end of the cavity and the term 'distal' refers to the region closest to the closed end.

As used herein, the terms 'upstream' and 'downstream' are used to describe the relative positions of components, or portions of components, of the aerosol-generating device in relation to the direction in which a user draws on the aerosol-generating device during use thereof.

As used herein, a 'susceptor assembly' means a conductive element that heats up when subjected to a changing magnetic field. This may be the result of eddy currents induced in the susceptor assembly, hysteresis losses, or both eddy currents and hysteresis losses. During use, the susceptor assembly is located in thermal contact or close thermal proximity with the aerosol-forming substrate of the aerosol-generating article received in the cavity of the aerosol-generating device. In this manner, the aerosol-forming substrate is heated by the susceptor assembly such that an aerosol is formed.

The susceptor assembly may have a shape corresponding to the shape of the corresponding induction coil. The susceptor assembly may have a diameter smaller than the diameter of the corresponding induction coil such that the susceptor assembly can be arranged inside of the induction coil.

The term 'heating zone' refers to a portion of the length of the cavity which is at least partially surrounded by the induction coil so that the susceptor assembly placed in or around the heating zone is inductively heatable by the induction coil. The heating zone may comprise a first heating zone and a second heating zone. The heating zone may be split into the first heating zone and the second heating zone. The first heating zone may be surrounded by a first induction coil. The second heating zone may be surrounded by a second induction coil. More than two heating zones may be provided. Multiple heating zones may be provided. An induction coil may be provided for each heating zone. One or more induction coils may be arranged moveable to surround the heating zones and configured for segmented heating of the heating zones.

The term 'coil' as used herein is interchangeable with the terms 'inductive coil' or 'induction coil' or 'inductor' or 'inductor coil' throughout. A coil may be a driven (primary) coil connected to the power supply.

The heating effect may be varied by controlling the first and second induction coils independently. The heating effect may be varied by providing the first and second induction coils with different configurations so that the magnetic field generated by each coil under the same applied current is different. For example, the heating effect may be varied by forming the first and second induction coils from different types of wire so that the magnetic field generated by each coil under the same applied current is different. The heating effect may be varied by controlling the first and second induction coils independently and by providing the first and second induction coils with different configurations so that the magnetic field generated by each coil under the same applied current is different.

The induction coil(s) are each disposed at least partially around the heating zone. The induction coil may extend only partially around the circumference of the cavity in the region of the heating zone. The induction coil may extend around the entire circumference of the cavity in the region of the heating zone.

The induction coil(s) may be a planar coil disposed around part of the circumference of the cavity or fully around the circumference of the cavity. As used herein a 'planar coil' means a spirally wound coil having an axis of winding which is normal to the surface in which the coil lies. The planar coil may lie in a flat Euclidean plane. The planar coil may lie on a curved plane. For example, the planar coil may be wound in a flat Euclidian plane and subsequently bent to lie on a curved plane.

Advantageously, the induction coil(s) is helical. The induction coil may be helical and wound around a central void in which the cavity is positioned. The induction coil may be disposed around the entire circumference of the cavity.

The induction coil(s) may be helical and concentric. The first and second induction coils may have different diameters. The first and second induction coils may be helical and concentric and may have different diameters. In such embodiments, the smaller of the two coils may be positioned at least partially within the larger of the first and second induction coils.

The windings of the first induction coil may be electrically insulated from the windings of the second induction coil.

The aerosol-generating device may further comprise one or more additional induction coils. For example, the aerosol-generating device may further comprise third and fourth induction coils, preferably associated with additional susceptors, preferably associated with different heating zones.

Advantageously, the first and second induction coils have different inductance values. The first induction coil may have a first inductance and the second induction coil may have a second inductance which is less than the first inductance. This means that the magnetic fields generated by the first and second induction coils will have different strengths for a given current. This may facilitate a different heating effect by the first and second induction coils while applying the same amplitude of current to both coils. This may reduce the control requirements of the aerosol-generating device. Where the first and second induction coils are activated independently, the induction coil with the greater inductance may be activated at a different time to the induction coil with the lower inductance. For example, the induction coil with the greater inductance may be activated during operation, such as during puffing, and the induction coil with the lower inductance may be activated between operations, such as between puffs. Advantageously, this may facilitate the maintenance of an elevated temperature within the cavity between uses without requiring the same power as normal use. This 'pre-heat' may reduce the time taken for the cavity to return to the desired operating temperature once operation of the aerosol-generating device use is resumed. Alternatively, the first induction coil and the second induction coil may have the same inductance values.

The first and second induction coils may be formed from the same type of wire. Advantageously, the first induction coil is formed from a first type of wire and the second induction coil is formed from a second type of wire which is different to the first type of wire. For example, the wire compositions or cross-sections may differ. In this manner, the inductance of the first and second induction coils may be different even if the overall coil geometries are the same. This may allow the same or similar coil geometries to be used for the first and second induction coils. This may facilitate a more compact arrangement.

The first type of wire may comprise a first wire material and the second type of wire may comprise a second wire material which is different from the first wire material. The electrical properties of the first and second wire materials may differ. For example, first type of wire may have a first resistivity and the second type of wire may have a second resistivity which is different to the first resistivity.

Suitable materials for the induction coil(s) include copper, aluminium, silver and steel. Preferably, the induction coil is formed from copper or aluminium.

Where the first induction coil is formed from a first type of wire and the second induction coil is formed from a second type of wire which is different to the first type of wire, the first type of wire may have a different cross-section to the second type of wire. The first type of wire may have a first cross-section and the second type of wire may have a second cross-section which is different to the first cross-section. For example, the first type of wire may have a first cross-sectional shape and the second type of wire may have a second cross-sectional shape which is different to the first cross-sectional shape. The first type of wire may have a first thickness and the second type of wire may have a second thickness which is different to the first thickness. The cross-sectional shape and the thickness of the first and second types of wire may be different.

The susceptor assembly may be formed from any material that can be inductively heated to a temperature sufficient to aerosolise an aerosol-forming substrate. The following examples and features concerning the susceptor assembly may apply to one or both of the central susceptor arrangement and the peripheral susceptor arrangement. Suitable materials for the susceptor assembly include graphite, molybdenum, silicon carbide, stainless steels, niobium, aluminium, nickel, nickel containing compounds, titanium, and composites of metallic materials. Preferred susceptor assemblys comprise a metal or carbon. Advantageously the susceptor assembly may comprise or consists of a ferromagnetic material, for example, ferritic iron, a ferromagnetic alloy, such as ferromagnetic steel or stainless steel, ferromagnetic particles, and ferrite. A suitable susceptor assembly may be, or comprise, aluminium. The susceptor assembly may comprise more than 5 percent, preferably more than 20 percent, more preferably more than 50 percent or more than 90 percent of ferromagnetic or paramagnetic materials. Preferred susceptor assemblys may be heated to a temperature in excess of 250 degrees Celsius.

The susceptor assembly may be formed from a single material layer. The single material layer may be a steel layer.

The susceptor assembly may comprise a non-metallic core with a metal layer disposed on the non-metallic core. For example, the susceptor assembly may comprise metallic tracks formed on an outer surface of a ceramic core or substrate.

The susceptor assembly may be formed from a layer of austenitic steel. One or more layers of stainless steel may be arranged on the layer of austenitic steel. For example, the susceptor assembly may be formed from a layer of austenitic steel having a layer of stainless steel on each of its upper and lower surfaces. The susceptor assembly may comprise a single susceptor material. The susceptor assembly may comprise a first susceptor material and a second susceptor material. The first susceptor material may be disposed in intimate physical contact with the second susceptor material. The first and second susceptor materials may be in intimate contact to form a unitary susceptor. In certain embodiments, the first susceptor material is stainless steel and the second susceptor material is nickel. The susceptor assembly may have a two layer construction. The susceptor assemblys may be formed from a stainless steel layer and a nickel layer.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding.

The second susceptor material may have a Curie temperature that is lower than 500 degrees Celsius. The first susceptor material may be primarily used to heat the susceptor when the susceptor is placed in an alternating electromagnetic field. Any suitable material may be used. For example, the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys. The Curie temperature of the second susceptor material may preferably be selected to be lower than 400 degrees Celsius, preferably lower than 380 degrees Celsius, or lower than 360 degrees Celsius. It is preferable that the second susceptor material is a magnetic material selected to have a Curie temperature that is substantially the same as a desired maximum heating temperature. That is, it is preferable that the Curie temperature of the second susceptor material is approximately the same as the temperature that the susceptor should be heated to in order to generate an aerosol from the aerosol-forming substrate. The Curie temperature of the second susceptor material may, for example, be within the range of 200 degrees Celsius to 400 degrees Celsius, or between 250 degrees Celsius and 360 degrees Celsius. In some embodiments it may be preferred that the first susceptor material and the second susceptor material are co-laminated. The co-lamination may be formed by any suitable means. For example, a strip of the first susceptor material may be welded or diffusion bonded to a strip of the second susceptor material. Alternatively, a layer of the second susceptor material may be deposited or plated onto a strip of the first susceptor material.

Preferably, the aerosol-generating device is portable. The aerosol-generating device may have a size comparable to a conventional cigar or cigarette. The system may be an electrically operated smoking system. The system may be a handheld aerosol-generating system. The aerosol-generating device may have a total length between approximately 30 millimetres and approximately 150 millimetres. The aerosol-generating device may have an external diameter between approximately 5 millimetres and approximately 30 millimetres.

The aerosol-generating device may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise a mouthpiece. The housing may comprise at least one air inlet. The housing may comprise more than one air inlet. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

Alternatively, the mouthpiece may be provided as part of an aerosol-generating article. A user may draw directly on the aerosol-generating article, preferably the proximal end of the aerosol-generating article.

As used herein, the term 'mouthpiece' refers to a portion of an aerosol-generating device that is placed into a user's mouth in order to directly inhale an aerosol generated by the aerosol-generating device from an aerosol-generating article received in the cavity of the housing.

One or more of the first air inlet and the second air inlet may be configured as a semi-open inlet. The semi-open inlet preferably allows air to enter the aerosol-generating device. Air or liquid may be prevented from leaving the aerosol-generating device through the semi-open inlet. The semi-open inlet may for example be a semi-permeable membrane, permeable in one direction only for air, but is air- and liquid-tight in the opposite direction. The semi-open inlet may for example also be a one-way valve. Preferably, the semi-open inlet allows air to pass through the inlet only if specific conditions are met, for example a minimum depression in the aerosol-generating device or a volume of air passing through the valve or membrane.

In a preferred embodiment, the aerosol-generating device may further comprises the first air inlet fluidly connected with the cavity and enabling ambient air to be drawn into the cavity and the second air inlet fluidly connected with the cavity and enabling ambient air to be drawn into the cavity. The first air inlet may be configured fluidly connected with the hollow inner of the central susceptor arrangement so that ambient air can be drawn into the hollow inner of the central susceptor arrangement through the first air inlet. The second air inlet may be configured fluidly connected with a peripheral portion of the cavity. The first air inlet and the second air inlet may not be fluidly connected within the aerosol-generating device, at least when the aerosol-generating article has been inserted into the cavity. When the aerosol-generating article is inserted into the cavity of the aerosol-generating device, the first air inlet may enable ambient air to be drawn through the hollow tubular inner of the aerosol-generating article. When the aerosol-generating article is inserted into the cavity of the aerosol-generating device, the second air inlet may enable ambient air to be drawn to the periphery of the aerosol-generating article. The peripheral susceptor arrangement may be arranged around the periphery of the aerosol-generating article. By means of the two separate air inlets, separate airflows are provided through the tubular hollow inner of the aerosol-generating article and into the aerosol-generating article from the periphery of the aerosol-generating article.

One or both of the airflow through the first air inlet and the second air inlet may be separately controllable. A ratio between the airflows through the first air inlet and the second air inlet may be controllable. One or both of the first air inlet and the second air inlet may be controllable by the controller. The cross-sectional area of one or both of the first air inlet and the second air inlet may be controllable by the controller.

Operation of the heating arrangement may be triggered by a puff detection system. Alternatively, the heating arrangement may be triggered by pressing an on-off button, held for the duration of the user's puff. The puff detection system may be provided as a sensor, which may be configured as an airflow sensor to measure the airflow rate. The airflow rate is a parameter characterizing the amount of air that is drawn through the airflow path of the aerosol-generating device per time by the user. The initiation of the puff may be detected by the airflow sensor when the airflow exceeds a predetermined threshold. Initiation may also be detected upon a user activating a button.

The sensor may also be configured as a pressure sensor to measure the pressure of the air inside the aerosol-generating device which is drawn through the airflow path of the device by the user during a puff. The sensor may be configured to measure a pressure difference or pressure drop between the pressure of ambient air outside of the aerosol-generating device and of the air which is drawn through the device by the user. The pressure of the air may be detected at the air inlet, the mouthpiece of the device, the cavity such as the heating chamber or any other passage or chamber within the aerosol-generating device, through which the air flows. When the user draws on the aerosol-generating device, a negative pressure or vacuum is generated inside the device, wherein the negative pressure may be detected by the pressure sensor. The term "negative pressure" is to be understood as a pressure which is relatively lower than the pressure of ambient air. In other words, when the user draws on the device, the air which is drawn through the device has a pressure which is lower than the pressure off ambient air outside of the device. The initiation of the puff may be detected by the pressure sensor if the pressure difference exceeds a predetermined threshold.

The aerosol-generating device may include a user interface to activate the aerosol-generating device, for example a button to initiate heating of the aerosol-generating device or display to indicate a state of the aerosol-generating device or of the aerosol-forming substrate.

An aerosol-generating system is a combination of an aerosol-generating device and one or more aerosol-generating articles for use with the aerosol-generating device. However, the aerosol-generating system may include additional components, such as, for example a charging unit for recharging an on-board electric power supply in an electrically operated or electric aerosol-generating device.

The invention further relates to a system comprising an aerosol-generating device as described herein and an aerosol-generating article comprising aerosol-forming substrate as described herein.

The aerosol-generating article may be substantially cylindrical in shape. The aerosol-generating article may be substantially elongate. The aerosol-generating article, preferably the substrate portion of the aerosol-generating article, may comprise a first tubular aerosol-forming substrate layer. The first tubular aerosol-forming substrate layer may define a cylindrical hollow central core. The aerosol-generating article, preferably the substrate portion of the aerosol-generating article, may comprise a second tubular aerosol-forming substrate layer. The second tubular aerosol-forming substrate layer may be arranged around the first tubular aerosol-forming substrate layer.

The substrate portion of the aerosol-generating article may be inserted into the cavity of the aerosol-generating device. During insertion of the substrate portion, the substrate portion may be sandwiched between the central susceptor arrangement and the peripheral susceptor arrangement. After insertion of the substrate portion, the central susceptor arrangement may be arranged within the cylindrical hollow central core of the substrate portion of the aerosol-generating article. The central susceptor arrangement may contact the first tubular aerosol-forming substrate layer. The central susceptor arrangement may not contact the second tubular aerosol-forming substrate layer. Ambient air drawn into the central susceptor arrangement through the first airflow channel may be heated by the central susceptor arrangement. Further, the central susceptor arrangement may heat the first tubular aerosol-forming substrate layer. By volatilizing the substrate of the first tubular aerosol-forming substrate layer, an aerosol may be generated. The aerosol may be drawn downstream through the aerosol-generating article, particularly the homogenization portion and filter portion of the aerosol-generating article. The aerosol may be drawn through the gaps provided between the central susceptors of the central susceptor arrangement.

The peripheral susceptor arrangement may be arranged surrounding the substrate portion of the aerosol-generating article after insertion of the substrate portion of the aerosol-generating article portion into the cavity of the aerosol-generating device. The peripheral susceptor arrangement may contact the second tubular aerosol-forming substrate layer. The peripheral susceptor arrangement may not contact the first tubular aerosol-forming substrate layer. Ambient air may be drawn through the second airflow channel into to the periphery of the aerosol-generating article and towards the peripheral susceptor arrangement. This air may be heated by the peripheral susceptor arrangement. Further, the peripheral susceptor arrangement may heat the second tubular aerosol-forming substrate layer. By volatilizing the substrate of the second tubular aerosol-forming substrate layer, an aerosol may be generated. This aerosol may be drawn downstream through the aerosol-generating article, particularly the second tubular aerosol-forming substrate layer and subsequently the homogenization portion and filter portion of the aerosol-generating article.

The aerosol generated by the heating action of the central susceptor arrangement of the first tubular aerosol-forming substrate layer may mix with the aerosol generated by the heating action of the peripheral susceptor arrangement of the second tubular aerosol-forming substrate layer. The aerosols may mix downstream of the substrate portion of the aerosol-generating article. The aerosols may mix in the homogenization portion of the aerosol-generating article.

The first tubular aerosol-forming substrate layer may be different from the second tubular aerosol-forming substrate layer. The two layers may be different in composition, structure or thickness. The composition may comprise one or both of flavor of the aerosol-forming substrate or material of the aerosol-forming substrate such as the tobacco. The structure may comprise one or more of the aerosol-forming substrate being porous, open cell foam, extruded and cast leaf.

The first tubular aerosol-forming substrate layer and the second tubular aerosol-forming substrate layer may be aligned coaxially.

The first tubular aerosol-forming substrate layer may be a nicotine containing layer. The first tubular aerosol-forming substrate layer may not comprise tobacco. The second tubular aerosol-forming substrate layer may be a tobacco-containing layer. The second tubular aerosol-forming substrate layer may not comprise nicotine or only a negligible amount of nicotine.

The first tubular aerosol-forming substrate layer may be a gel layer. The second tubular aerosol-forming substrate layer may be a gel layer.

The melting point of the first tubular aerosol-forming substrate layer may be different from the melting point of the second tubular aerosol-forming substrate layer.

The aerosol-forming substrate of the first tubular aerosol-forming substrate layer may be different from the aerosol-forming substrate of the second tubular aerosol-forming substrate layer. Preferably, the first tubular aerosol-forming substrate layer is configured as one or both of a nicotine layer and a flavor layer. Preferably, the second tubular aerosol-forming substrate layer is configured as a primary aerosol-forming layer comprising tobacco and an aerosol former. Consequently, the second tubular aerosol-forming substrate layer may be configured to generate the inhalable aerosol, while the first tubular aerosol-forming substrate layer may be configured to influence the characteristics such as the flavor or nicotine content of the aerosol.

The first tubular aerosol-forming substrate may comprise a flavorant, preferably menthol.

A membrane may be arranged between the first tubular aerosol-forming substrate layer and the second tubular aerosol-forming substrate layer. The membrane may be configured as a film. The membrane may be configured as a foil. The membrane may be any of: vapour, gas or aerosol permeable. The membrane is preferably configured aerosol permeable. The membrane may be configured as a filter. The membrane may be configured to filter larger particles containing in the aerosol but permeable to smaller particles.

The article may further comprise a homogenization portion downstream of the first and second tubular aerosol-forming substrates. The homogenization portion may be a filter portion. The homogenization portion may be a hollow filter portion. The homogenization portion may be a hollow acetate tube. The homogenization portion may be configured for cooling of the aerosol. The homogenization portion may directly abut one or both of the first and second tubular aerosol-forming substrate layers. The homogenization portion may be aligned with one or both of the first and second tubular aerosol-forming substrate layers. Preferably, the homogenization portion is hollow and the inner diameter of the homogenization portion is identical or substantially identical to the inner diameter of the first tubular aerosol-forming substrate layer. The homogenization portion may comprise a flavorant. The homogenization portion may comprise a capsule or disc. The capsule or disc may comprise a flavorant. The capsule or disc may be arranged centrally within the homogenization portion.

The aerosol-generating article may further comprise a mouthpiece filter downstream of the homogenization portion. The mouthpiece filter may be an acetate filter. The mouthpiece filter may be made from acetate tower. The mouthpiece filter may be a cylindrical filter. The mouthpiece filter may not be a hollow filter. The mouthpiece filter may comprise fibers, preferably linear longitudinal low-density fibers.

The second tubular aerosol-forming substrate layer may be circumscribed by a wrapper. The wrapper may be made from wrapping paper. The wrapper may be made from cigarette wrapping paper. The wrapper may be made from standard cigarette wrapping paper. Alternatively, the wrapper may be a tobacco-paper. Tobacco-paper may have the benefit of avoiding influencing the taste in an undesired way. The wrapper may have two open ends. The two open ends may overlap when the wrapper is wrapped around the second tubular aerosol-forming substrate layer. The two ends may be joined by an adhesive in the overlapping region. The wrapper may be air permeable.

The invention may further relate to a method of manufacturing an aerosol-generating article, the method comprising:

- providing a first sheet of a first aerosol-forming substrate,
- providing a second sheet of a second aerosol-forming substrate on the first sheet,
- rolling the first and second sheets thereby forming a hollow tubular aerosol-generating article.

Alternatively to one or both of providing the first aerosol-forming substrate as a first sheet and providing the second aerosol-forming substrate as a second sheet on the first sheet and rolling the sheet, an extrusion process may be employed. In the extrusion process, the first aerosol-forming substrate may be extruded separately or together with the second aerosol-forming substrate. In the extrusion process, the first aerosol-forming substrate may be extruded to form a first tubular aerosol-forming substrate layer. In the extrusion process, the second aerosol-forming substrate may be extruded to form a second tubular aerosol-forming substrate layer. The second aerosol-forming substrate layer may be arranged surrounding the first tubular aerosol-forming substrate layer. Manufacturing the aerosol-generating article by means of an extrusion processes may be particularly beneficial if one or both of the first and second aerosol-forming substrates are provided as a gel.

The first and second sheets may be rolled such that opposite edges of the sheets are brought into contact. During rolling or after rolling of the first and second sheets, a wrapping paper may be wrapped around the second sheet of aerosol-forming substrate. The wrapping paper may be air permeable.

After providing the first sheet, a membrane may be placed on the first sheet. The second sheet may be provided on the membrane. The membrane may be a film or foil.

The method may comprise the further step of providing a homogenization portion as described herein downstream of the first and second tubular aerosol-forming substrates.

The method may comprise the further step of providing a mouthpiece filter as described herein downstream of the homogenization portion.

The aerosol-forming substrate described in the following may be one or both of the aerosol-forming substrate of the first tubular aerosol-forming substrate layer and the second tubular aerosol-forming substrate layer. Preferably, a nicotine or flavor/flavorant containing aerosol-forming substrate may be employed in the first tubular aerosol-forming substrate layer, while a tobacco containing aerosol-forming substrate may be employed in the second tubular aerosol-forming substrate layer.

The aerosol-forming substrate may comprise nicotine. The nicotine-containing aerosol-forming substrate may be a nicotine salt matrix.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. Alternatively, the aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate may comprise a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1, 3-butanediol. Preferably, the aerosol former is glycerine. Where present, the homogenised tobacco material may have an aerosol-former content of equal to or greater than 5 percent by weight on a dry weight basis, and preferably from about 5 percent to about 30 percent by weight on a dry weight basis. The aerosol-forming substrate may comprise other additives and ingredients, such as flavourants.

The aerosol-generating article and the cavity of the aerosol-generating device may be arranged such that the aerosol-generating article is partially received within the cavity of the aerosol-generating device. The cavity of the aerosol-generating device and the aerosol-generating article may be arranged such that the aerosol-generating article is entirely received within the cavity of the aerosol-generating device.

The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

The aerosol-generating article may have a total length between approximately 30 millimetres and approximately 100 millimetres. In one embodiment, the aerosol-generating article has a total length of approximately 45 millimetres. The aerosol-generating article may have an external diameter between approximately 5 millimetres and approximately 12 millimetres. In one embodiment, the aerosol-generating article may have an external diameter of approximately 7.2 millimetres.

The aerosol-forming substrate may be provided as an aerosol-forming segment having a length of between about 7 millimetres and about 15 millimetres. In one embodiment, the aerosol-forming segment may have a length of approximately 10 millimetres. Alternatively, the aerosol-forming segment may have a length of approximately 12 millimetres.

The aerosol-generating segment preferably has an external diameter that is approximately equal to the external diameter of the aerosol-generating article. The external diameter of the aerosol-forming segment may be between approximately 5 millimetres and approximately 12 millimetres. In one embodiment, the aerosol-forming segment may have an external diameter of approximately 7.2 millimetres.

The aerosol-generating article may comprise a filter plug. The filter plug may be configured as the mouthpiece filter. The filter plug may be located at a downstream end of the aerosol-generating article. The filter plug may be a cellulose acetate filter plug. The filter plug may be a hollow cellulose acetate filter plug. The filter plug is approximately 7 millimetres in length in one embodiment, but may have a length of between approximately 5 millimetres to approximately 10 millimetres.

The aerosol-generating article may comprise an outer paper wrapper. The outer paper wrapper may be configured as the wrapping paper described herein. The outer paper wrapper may extend of the whole aerosol-generating article. The outer paper wrapper may be configured to connect and hold the different elements of the aerosol-generating article.

Further, the aerosol-generating article may comprise a separation between the aerosol-forming substrate and the filter plug. The separation may be approximately 18 millimetres, but may be in the range of approximately 5 millimetres to approximately 25 millimetres.

The aerosol-generating device may comprise a resilient sealing element. The resilient sealing element may be arranged at the downstream end of the cavity. The resilient sealing element may be arranged surrounding the downstream end of the cavity. The resilient sealing element may have a circular shape. The resilient sealing element may have a funnel shape facilitating insertion of the aerosol-generating article. The resilient sealing element may apply pressure to the aerosol-generating article after insertion of the aerosol-generating article to hold the aerosol-generating article in place. The resilient sealing element may abut the aerosol-generating article after insertion of the aerosol-generating article into the cavity. The resilient sealing element may be air impenetrable to prevent air from escaping the cavity except for escaping through the aerosol-generating article.

The aerosol-generating article may comprise a thermally insulating element. The thermally insulating element may be arranged surrounding the cavity. The thermally insulating element may be arranged between the housing of the aerosol-generating device and the cavity. The thermally insulating element may be tubular. The thermally insulating element may be coaxially aligned with the induction heating assembly, preferably coaxially aligned with the peripheral susceptor arrangement.

Features described in relation to one embodiment may equally be applied to other embodiments of the invention.

The invention will be further described, by way of example only, with reference to the accompanying drawings in which.

Figure 1:
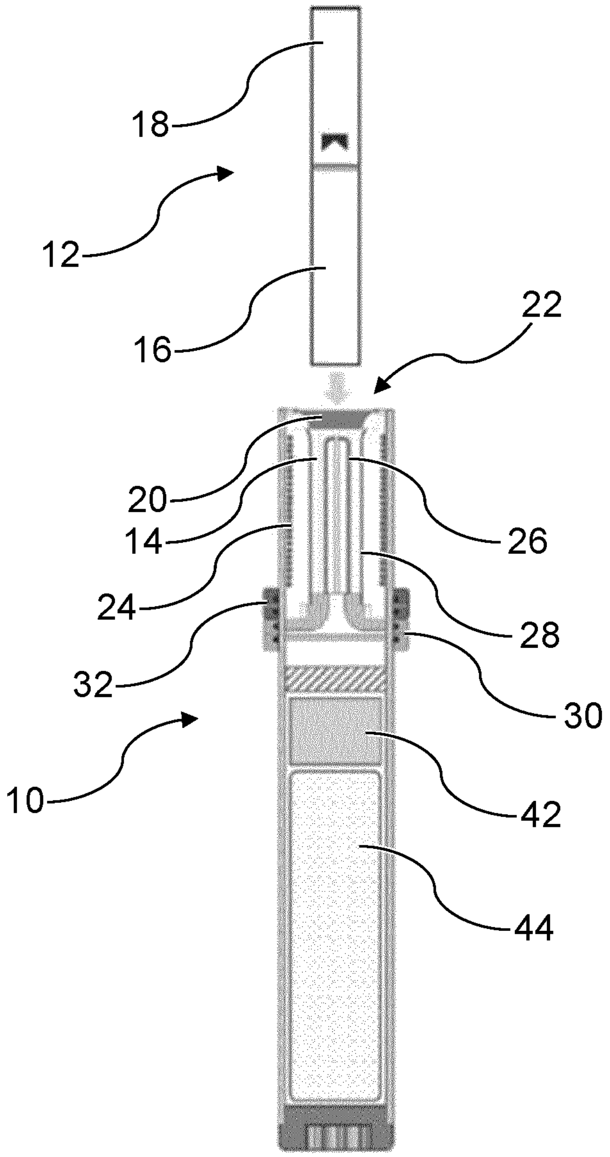
FIG. 1 shows a cross-sectional view of an aerosol-generating device and an aerosol-generating article according to the present invention.

FIG. 1 shows an aerosol-generating device 10 and an aerosol-generating article 12. In other words, FIG. 1 shows an aerosol-generating system comprising an aerosol-generating device 10 and an aerosol-generating article 12.

The aerosol-generating device 10 comprises a cavity 14 for insertion of the aerosol-generating article 12. When the aerosol-generating article 12 is inserted into the cavity 14, a substrate portion 16 of the aerosol-generating article 12 is inserted into the cavity 14. A filter portion 18 of the aerosol-generating article 12 sticks out of the cavity 14 and a user may directly draw on the filter portion 18 of the aerosol-generating article 12.

A resilient sealing element 20 is arranged at a downstream end 22 of the cavity 14. The resilient sealing element 20 is configured to aid insertion of the aerosol-generating article 12 into the cavity 14 and holding of the aerosol-generating article 12 after insertion of the aerosol-generating article 12 into the cavity 14. The resilient sealing element 20 has a funnel shape. The resilient sealing element 20 has a circular shape surrounding the downstream end 22 of the cavity 14.

The aerosol-generating device 10 comprises an induction assembly. The induction assembly comprises an induction coil 24. The induction assembly further comprises a susceptor assembly. The susceptor assembly comprises, preferably consists of, a central susceptor arrangement 26 and a peripheral susceptor arrangement 28. The central susceptor arrangement 26 is arranged within the peripheral susceptor arrangement 28. Between the central susceptor arrangement 26 and the peripheral susceptor arrangement 28, the cavity 14 for insertion of the aerosol-generating article 12 is provided. The cavity 14 has a hollow tubular cylinder-shaped volume.

The aerosol-generating article 12 is sandwiched between the central susceptor arrangement 26 and the peripheral susceptor arrangement 28. The central susceptor arrangement 26 and the peripheral susceptor arrangement 28 may be arranged distanced from each other so as to hold the aerosol-generating article 12 within the cavity 14. The distance between the central susceptor arrangement 26 and the peripheral susceptor arrangement 28 may be identical or slightly smaller than the distance between the outer diameter of the aerosol-generating article 12 and the inner diameter of the aerosol-generating article 12. The substrate portion 16 of the aerosol-generating article 12 is preferably a hollow tubular substrate portion 16. Consequently, the substrate portion 16 of the aerosol-generating article 12 can be pushed over the central susceptor arrangement 26. In this case, the central susceptor arrangement 26 penetrates into the hollow tubular volume of the substrate portion 16 of the aerosol-generating article 12. At the same time, the peripheral susceptor arrangement 28 abuts the periphery of the substrate portion 16 of the aerosol-generating article 12.

FIG. 1 further shows a first air inlet 30 and a second air inlet 32. The first air inlet 30 is fluidly connected with the central susceptor arrangement 26. The central susceptor arrangement 26 is preferably hollow. Airflow may be enabled from the first air inlet 30 towards the hollow inner of the central susceptor arrangement 26 and downstream out of the cavity 14 of the aerosol-generating device 10. The second air inlet 32 is fluidly connected with the periphery of the peripheral susceptor arrangement 28. When the aerosol-generating article 12 is inserted into the cavity 14, two separate airflows are provided. The first airflow from the first air inlet 30 flows through the hollow inner volume of the aerosol-generating article 12. The second airflow from the second air inlet 32 flows from the periphery of the aerosol-generating article 12 into the aerosol-generating article 12 and further downstream out of the cavity 14 of the aerosol-generating device 10.

Figure 3:
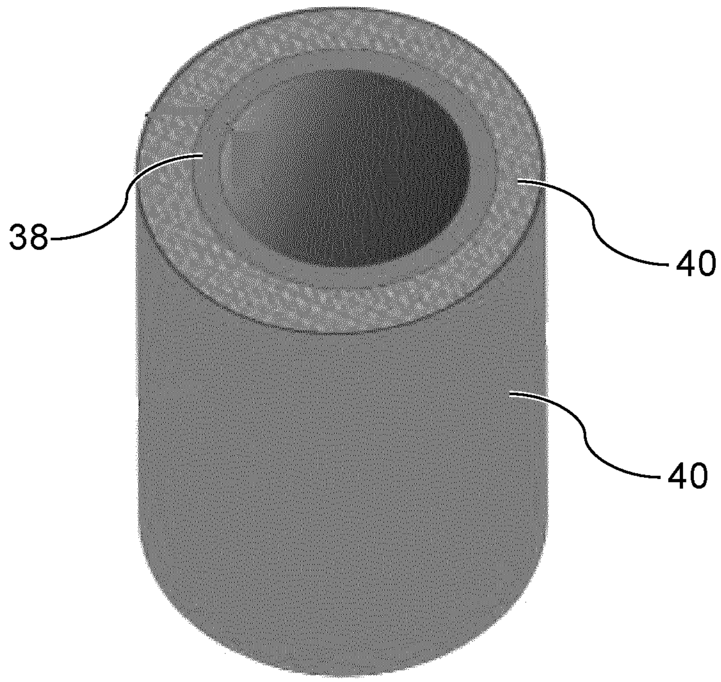
FIG. 3 shows an embodiment of the aerosol-generating article.

The substrate portion 16 of the aerosol-generating article 12 shown in FIG. 3 preferably comprises a first tubular aerosol-forming substrate layer 38 and a second tubular aerosol-forming substrate layer 40. The first tubular aerosol-forming substrate layer 38 is arranged inside of the substrate portion 16 and surrounded by the second tubular aerosol-forming substrate layer 40. The first tubular aerosol-forming substrate layer 38 preferably comprises one or both of a nicotine and flavor substrate. The second tubular aerosol-forming substrate layer 40 preferably comprises a tobacco aerosol-generating substrate. By providing two separate airflows, the first airflow may be adjusted to influence one or both of nicotine and flavor of the generated aerosol and the second airflow may be adjusted to generate the desired aerosol from the tobacco substrate.

The first air inlet 30 and the second air inlet 32 may be configured adjustable. Particularly, the cross-sectional area of one or both of the first air inlet 30 and the second air inlet 32 may be configured adjustable. In this way, properties of the generated aerosol such as the nicotine content and the flavor may be adjusted by adjusting the airflow through one or both of the first air inlet 30 and the second air inlet 32.

For adjusting one or both of the first air inlet 30 and the second air inlet 32, the aerosol-generating device 10 may comprise a controller 42. The controller 42 may further be configured to control operation of the induction assembly. Particularly, the controller 42 may be configured to control the supply of electrical energy from a power source to the induction coil 24. The power supply 44 may be configured as a battery.

Figure 2:
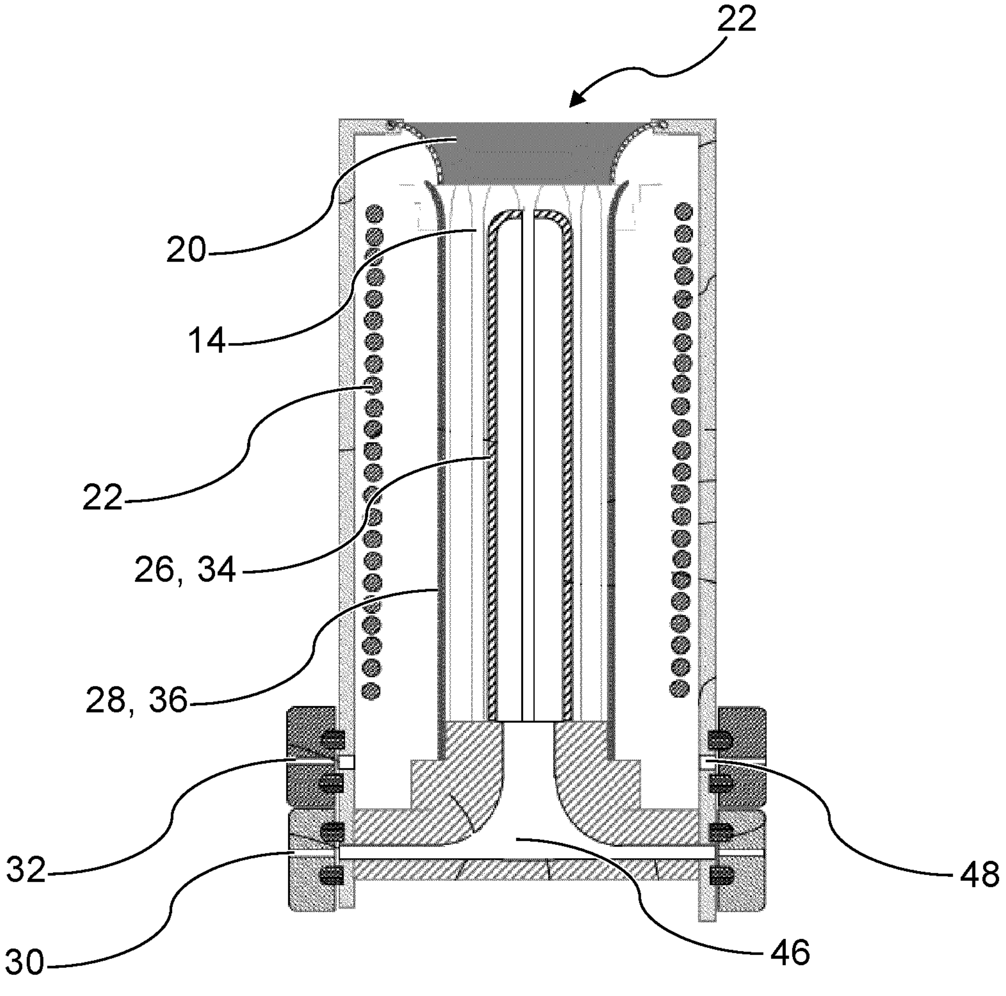
FIG. 2 shows a cross-sectional view of a cavity of the aerosol-generating device for inserting the aerosol-generating article.

FIG. 2 shows a proximal portion of the aerosol-generating device 10 in more detail. In FIG. 2, the cavity 14 for insertion of the aerosol-generating device 10 can clearly be seen. Within the cavity 14, the central susceptor arrangement 26 comprising individual central susceptors 34 is arranged. Surrounding the central susceptor arrangement 26, the peripheral susceptor arrangement 28 comprising multiple flared blade-shaped peripheral susceptors 36 is arranged.

Surrounding the susceptor arrangement, the induction coil 24 is arranged. The induction coil 24 surrounds the cavity 14. In an upstream region of the cavity 14, a first airflow channel 46 is arranged. The first airflow channel 46 fluidly connects the first air inlet 30 with the hollow inner of the central susceptor arrangement 26. Adjacent the first airflow channel 46, a second airflow channel 48 is arranged. The second airflow channel 48 fluidly connects the second air inlet 32 with the periphery of the peripheral susceptor arrangement 28.

FIG. 3 shows an embodiment of the aerosol-generating article 12, more particularly of the substrate portion 16 of the aerosol-generating article 12. The substrate portion 16 of the aerosol-generating article 12 comprises a first tubular aerosol-forming substrate layer 38. The first tubular aerosol-forming substrate layer 38 is arranged adjacent the hollow inner of the aerosol-generating article 12. The first tubular aerosol-forming substrate layer 38 is configured as one or both of a nicotine and flavor layer. Surrounding the first tubular aerosol-forming substrate layer 38, a second tubular aerosol-forming substrate layer 40 is arranged. The second tubular aerosol-forming substrate layer 40 is configured as a tobacco-containing aerosol-forming layer. Between the first tubular aerosol-forming substrate layer 38 and the second tubular aerosol-forming substrate layer 40, a membrane such as a film or foil may be provided. Circumscribing the second tubular aerosol-forming substrate layer 40, a wrapping paper may be arranged.

Figure 4:
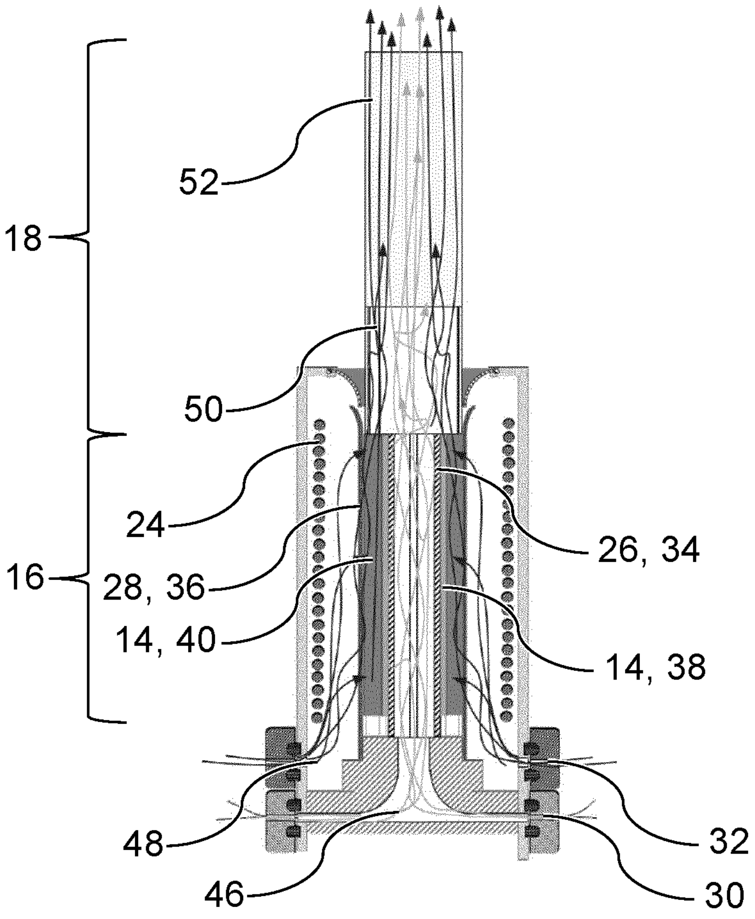
FIG. 4 shows the airflow through the aerosol-generating device.

FIG. 4 shows the airflow through the aerosol-generating device 10 in more detail. The airflow is indicated by the arrows. Two separate airflow channels 46, 48 are provided. The first airflow channel 46 starts at the first air inlet 30 and fluidly connects the hollow inner of the central susceptor arrangement 26 with the first air inlet 30. The air from the first airflow channel 46 enters the central susceptor arrangement 26 at the base of the central susceptor arrangement 26. Inside of the central susceptor arrangement 26, an aerosol may be formed. The aerosol may be formed by heating of the first tubular aerosol-forming substrate layer 38 as well as of the air inside of the central susceptor arrangement 26 by the central susceptor arrangement 26. The substrate of the first tubular aerosol-forming substrate layer 38 is volatilized by the heat of the central susceptor arrangement 26. The contact area between the air and the first tubular aerosol-forming substrate layer 38 may be optimized by gaps between the individual central susceptors 34 and by providing the central susceptors 34 as porous susceptors. The volatilized substrate is entrained by the air flowing through the central susceptor arrangement 26. The generated aerosol flows through the central susceptor arrangement 26 downstream towards the filter portion 18 of the aerosol-generating article 12. The filter portion 18 may comprise a homogenization portion 50 such as a hollow acetate tube for cooling of the aerosol directly adjacent and downstream of the substrate portion 16. Downstream of the homogenization portion, an acetate tow filter 52 may be provided in the aerosol-generating article 12.

The second airflow channel 48 starts at the second air inlet 32. The second airflow channel 48 fluidly connects the second air inlet 32 with the periphery of the substrate portion 16 of the aerosol-generating article 12 after insertion of the aerosol-generating article 12 into the cavity 14. The periphery of the substrate portion 16 may be part of the cavity 14. The peripheral susceptor arrangement 28 is arranged in the periphery of the substrate portion 16 and preferably in contact with the substrate portion 16. The contact area between the air and the second tubular aerosol-forming substrate layer 40 may be optimized by gaps between the individual peripheral susceptors 36 and by providing the peripheral susceptors 36 as porous susceptors. The air from the second airflow channel 48 may entrain volatilized substrate of the second tubular aerosol-forming substrate layer 40 heated by the peripheral susceptor arrangement 28. The aerosol may be drawn downstream through the second tubular aerosol-forming substrate layer 40. Subsequently, the aerosol may be drawn into the filter portion 18 of the aerosol-generating article 12. In the filter portion 18 of the aerosol-generating article 12, the aerosol generated within the aerosol-generating article 12 by means of the heat of the central susceptor arrangement 26 may mix with the aerosol generated by the peripheral susceptor arrangement 28 by heating the second tubular aerosol-forming substrate layer 40. A wrapper may be arranged around the substrate portion 16 of the aerosol-generating article 12. The wrapper is preferably air permeable such that the air from the second airflow channel 48 can enter into the second tubular aerosol-forming substrate layer 40.

Figure 5:
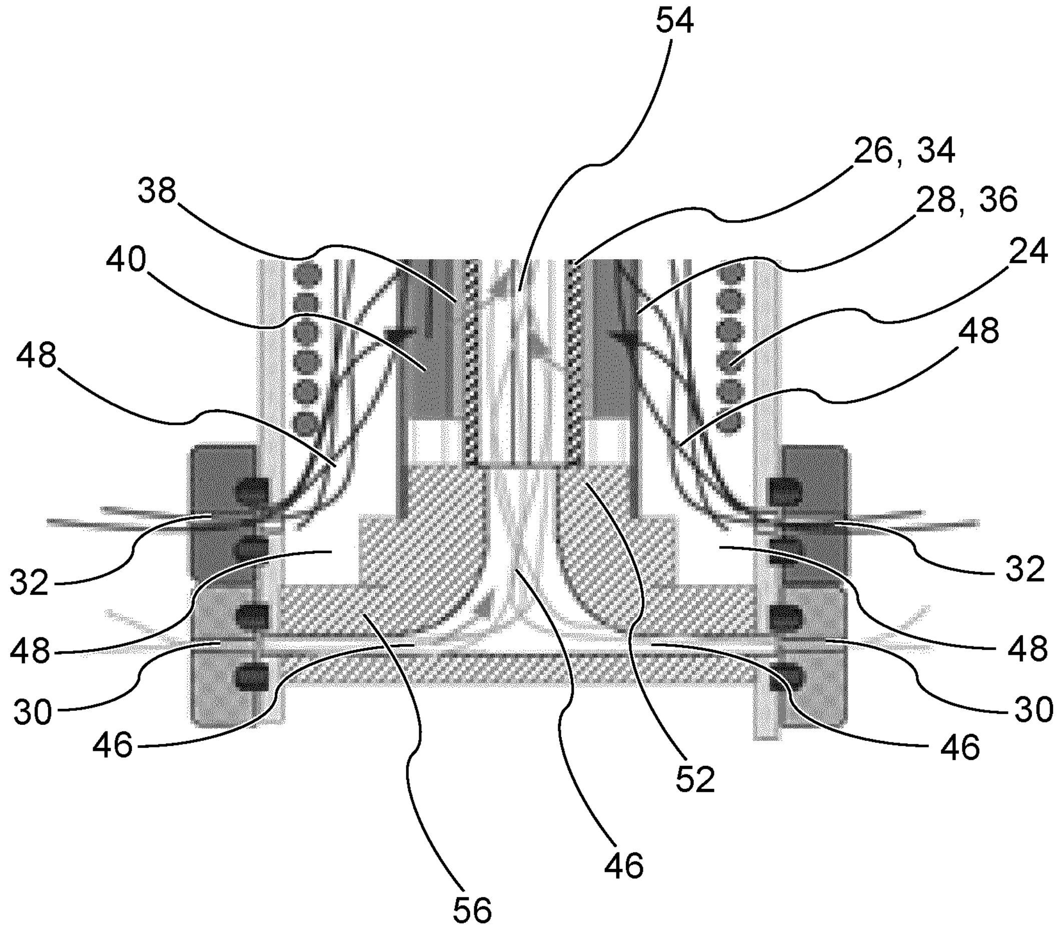
FIG. 5 shows a more detailed view of first and second airflow channels.

FIG. 5 shows a more detail the first air inlet 30, the second air inlet 32, the first airflow channel 46 and the second airflow channel 48. The first air inlet 30 and the second air inlet 32 are arranged in the housing of the aerosol-generating device. As depicted in FIG. 5, the first air inlet 30 may comprise two separate air inlets on opposite sides of the housing of the aerosol-generating device 10. Similarly, the second air inlet 32 comprises two separate air inlets on opposite sides of the housing of the aerosol-generating device 10. From the first air inlet 30, ambient air can be drawn into the aerosol-generating device 10. The ambient air is drawn into the aerosol-generating device 10 by means of the first airflow channel 46. The first airflow channel 46 extends perpendicular to the longitudinal central axis of the cavity adjacent to the first air inlet 30. The first airflow channel 46 leads the air towards a central portion 54 of the cavity 14. The central portion 54 of the cavity 14 extends along the longitudinal central axis of the cavity 14. The first airflow channel 46 directs the air to the central portion 54 of the cavity 14 at a base 56 arranged upstream of the central portion 54 of the cavity 14.

The second airflow channel 48 is separated from the first airflow channel 46 by the base 56. The base 56 may be connected to the housing of the aerosol-generating device 10. Further, the peripheral susceptor arrangement 28 and the central susceptor arrangement 26 may be attached to the base 56. The second airflow channel 48 directs air from the second air inlet 32 towards the periphery of the aerosol-generating article 12 inserted into the cavity 14. As can be seen by the arrows in FIG. 5, the first airflow channel 46 is fluidly separated from the second airflow channel 48 by means of the separate first air inlet 30, the second air inlet 32, the base 56 and the substrate portion 18 of the inserted aerosol-generating article 12. Without the inserted aerosol-generating article 12, the first airflow channel 46 is fluidly separated from the second airflow channel 48 at least upstream of the cavity 14.

The invention claimed is:

1. An aerosol-generating device, comprising:
- a cavity configured to receive an aerosol-generating article comprising an aerosol-forming substrate;
- a first air inlet fluidly connected with the cavity and configured to enable ambient air to be drawn into the cavity; and
- a second air inlet fluidly connected with the cavity and configured to enable ambient air to be drawn into the cavity,
- wherein the first air inlet is further configured to be fluidly connected with a central portion of the cavity,
- wherein the second air inlet is further configured to be fluidly connected with a peripheral portion of the cavity,
- wherein the first air inlet is further away from a mouth end of the aerosol-generating device than the second air inlet along a longitudinal axis direction through the aerosol-generating device, and
- wherein the peripheral portion of the cavity is physically separated from the central portion of the cavity such that air from the peripheral portion does not mix with air from the central portion until the air exits the cavity at a downstream end of the cavity.

2. The aerosol-generating device according to claim 1,
- further comprising an induction heating arrangement comprising an induction coil and a susceptor assembly, and
- wherein the susceptor assembly comprises a central susceptor arrangement arranged centrally within the cavity, and a peripheral susceptor arrangement arranged distanced from and around the central susceptor arrangement.

3. The aerosol-generating device according to claim 2, wherein the central portion of the cavity is arranged within the central susceptor arrangement.

4. The aerosol-generating device according to claim 2, wherein the peripheral portion of the cavity is arranged around the central susceptor arrangement and within the peripheral susceptor arrangement.

5. The aerosol-generating device according to claim 1, further comprising a first airflow channel fluidly connecting the first air inlet with the central portion of the cavity.

6. The aerosol-generating device according to claim 5, further comprising a second airflow channel fluidly connecting the second air inlet with the peripheral portion of the cavity.

7. The aerosol-generating device according to claim 6, wherein the first airflow channel is arranged distanced from the second airflow channel.

8. The aerosol-generating device according to claim 6, wherein the first airflow channel is configured fluidly separated from the second airflow channel.

9. The aerosol-generating device according to claim 5, wherein the first airflow channel is arranged upstream of the cavity.

10. The aerosol-generating device according to claim 6, wherein the second airflow channel is arranged adjacent an upstream portion of the cavity.

11. The aerosol-generating device according to claim 2, wherein one or both of the central susceptor arrangement and the peripheral susceptor arrangement comprises susceptors that are elongate.

12. The aerosol-generating device according to claim 2, wherein one or both of the central susceptor arrangement and the peripheral susceptor arrangement are arranged around a central longitudinal axis of the cavity.

13. The aerosol-generating device according to claim 2, wherein one or both of the central susceptor arrangement and the peripheral susceptor arrangement define a part of the cavity.

14. The aerosol-generating device according to claim 2, wherein the central susceptor arrangement and the peripheral susceptor arrangement are coaxially arranged.

15. A system, comprising:

an aerosol-generating device according to claim 1; and an aerosol-generating article comprising an aerosol-forming substrate.

* * * * *